United States Patent [19]

Katayama et al.

[11] Patent Number: 5,422,865
[45] Date of Patent: Jun. 6, 1995

[54] LIGHT MODULATION METHOD FOR MAGNETO-OPTICAL RECORDING DEVICE

[75] Inventors: Hiroyuki Katayama; Junji Hirokane; Junichiro Nakayama; Akira Takahashi; Kenji Ohta, all of Nara, Japan

[73] Assignee: Sharp Kabushiki Kaisha, Osaka, Japan

[21] Appl. No.: 163,355

[22] Filed: Dec. 7, 1993

[30] Foreign Application Priority Data

Dec. 10, 1992 [JP] Japan .................. 4-330637

[51] Int. Cl.⁶ .............................. G11B 13/04
[52] U.S. Cl. ...................... 369/13; 369/116; 369/275.2
[58] Field of Search ............ 369/13, 116, 14, 272, 369/275.2, 14; 360/59, 114; 365/122; 428/694 R, 694 ML, 694 NF, 694 MM

[56] References Cited

U.S. PATENT DOCUMENTS

| | | | |
|---|---|---|---|
| 4,939,717 | 7/1990 | Ohno et al. | 369/116 |
| 5,038,338 | 8/1991 | Terao et al. | 369/116 |
| 5,144,601 | 9/1992 | Maeda et al. | 369/13 |
| 5,257,256 | 10/1993 | Terao et al. | 369/116 |

FOREIGN PATENT DOCUMENTS

| | | | |
|---|---|---|---|
| 1-311440 | 12/1989 | Japan . | |
| 4146543 | 5/1992 | Japan | 369/13 |
| 4325946 | 11/1992 | Japan | 369/13 |
| 4355236 | 12/1992 | Japan | 369/13 |
| 5151638 | 6/1993 | Japan | 369/13 |
| 5182272 | 7/1993 | Japan | 369/13 |
| 5290435 | 11/1993 | Japan | 369/13 |

OTHER PUBLICATIONS

PCT/JP92/01701 (WO 93/13523), Jul. 8, 1993.

Primary Examiner—Georgia Y. Epps
Assistant Examiner—Tan Dinh
Attorney, Agent, or Firm—David G. Conlin; Kevin J. Fournier

[57] ABSTRACT

A magneto-optical recording method includes the steps of applying an external magnetic field perpendicularly onto the magnetic thin film with perpendicular magnetization of a magneto-optical recording medium and projecting a light beam onto the magneto-optical recording medium; and modulating the intensity of the light beam between the first light intensity and the second light intensity in response to the information to be recorded while shifting a spot of the light beam, thereby recording information. In the above method, the first light intensity is set such that by reducing the coercive force of the magnetic thin film with perpendicular magnetization, a magnetic domain is formed on the magnetic thin film with perpendicular magnetization, and that the magnetic domain is moved as the spot of the light beam is shifted. The second light intensity is set such that by increasing the coercive force of the magnetic thin film with perpendicular magnetization, the magnetic domain is fixed to the position.

12 Claims, 4 Drawing Sheets

LIGHT MODULATION METHOD FOR MAGNETO-OPTICAL RECORDING DEVICE

FIELD OF THE INVENTION

The present invention relates to a magneto-optical recording method for carrying out a direct-overwriting operation through the light intensity modulation on a magneto-optical recording medium such as a magneto-optical disk.

BACKGROUND OF THE INVENTION

Recently, magneto-optical memory devices such as magneto-optical disks have been viewed with interest as rewritable high density and large capacity memory devices. Especially, a demand for a magneto-optical memory device, whereon a so-called direct-overwriting operation can be carried out without erasing the previously recorded information, is increasing. In order to meet the demand, some methods for direct-overwriting have been proposed, which are roughly classified into the following two methods: the magnetic field modulation method and the light intensity modulation method.

An overwriting operation through the magnetic field modulation is carried out in the following way. A light beam of a constant intensity is projected on a predetermined recording area of the magneto-optical recording medium so as to raise the temperature of the recording layer of the magneto-optical recording medium, and an external magnetic field which reverses in response to the recording information is applied onto the recording area. As a result, the magnetization direction in the recording layer of the recording medium is reversed in response to the recording information, thereby enabling a direct-overwriting.

The representative recording methods by the light intensity modulation are the method which adapts the exchange coupled magnetic doublelayer film as disclosed in the technical digest of the 34th Meeting by the Applied Physics Society in 1987, page 721 (28p-ZL-3), and the method in which the demagnetizing field is utilized (Appl. Phys. Lett., 49(1986) 473-474). In the above methods, in recording, an external magnetic field of a constant intensity is applied onto the magneto-optical recording medium.

In the first method, a magneto-optical recording medium composed of an exchange-coupled doublelayer film is used, wherein a recording layer made of a magnetic substance having a large coercive force at room temperature and a low Curie temperature and a subsidiary recording layer made of a magnetic substance having a small coercive force at room temperature and a high Curie temperature are laminated. In this method, prior to overwriting, an initializing magnetic field larger than coercive force of the subsidiary recording layer at room temperature is applied onto the magneto-optical recording medium so as to arrange the magnetization direction in the subsidiary recording layer in one direction. Thereafter, with the application of the magnetic field having a magnetization in an opposite direction to the initializing magnetic field onto the magneto-optical recording medium, the temperature of the magneto-optical recording medium is raised to the vicinity of the Curie temperature of the subsidiary recording layer. Then, a direct-overwriting can be carried out by modulating the intensity of the laser beam to be projected onto the recording medium in response to information to be recorded between High level for reversing the respective magnetizations in the recording layer and the subsidiary recording layer and Low level for raising the temperature of the recording medium only up to the vicinity of the Curie temperature of the recording layer so as to prevent the magnetization in the subsidiary recording layer to be reversed, i.e., so as to arrange only the magnetization direction in the recording layer in the magnetization direction of the subsidiary recording layer.

On the other hand, in the second method, a magneto-optical recording medium having a singlelayer structure is used. In this method, a force exerted on a magnetic wall formed on the boundary between the recorded magnetic domains so as to make larger or smaller the magnetic domain is controlled by adjusting only the intensity of the laser beam to be projected. Consequently, by making smaller the size of the recording bits, the recording bits disappear (are erased), and by making larger the size of the recording bit, the direct overwriting is enabled. More concretely, by projecting a laser beam of a constant intensity, a recording bit (magnetic domain) is formed by a laser pulse with a predetermined time interval, and by projecting a laser pulse with a shorter time interval than the laser pulse onto the recording bit, the recording bit is erased.

However, in the above recording method by the magnetic field modulation, since the magnetization direction in the external magnetic field is required to be switched at high speed, the magnetic head must be made smaller so as to make smaller the inductance. Moreover, the magnetic head must be set closer to the magneto-optical recording medium, and thus the magnetic head may be brought in contact with the magneto-optical recording medium, thereby presenting the problem that the magneto-optical recording medium is scarred or the magnetic head is crushed. Namely, non-contact recording and reproducing of information may not be ensured although it is the main feature of the magneto-optical recording medium. Additionally, in order to set the magnetic field to be reversed at high speed, the drive circuit of the magnetic head must be made complicated, thereby increasing the cost of the magneto-optical recording device.

Moreover, in the method by the light intensity modulation using the exchange coupled magnetic doublelayer film, since the exchange coupled force which greatly affects the structure of the magneto-optical recording medium is used, it is difficult to set each magnetic layer to have predetermined magnetic properties especially in a large area. Moreover, besides the reproducing laser power, additional two powers of high level and low level which are used in overwriting are required to be controlled. Thus, the structure of the device becomes complicated when the above method was adapted.

In the magneto-optical recording method utilizing the demagnetizing field, the magneto-optical recording medium of a singlelayer structure is used. Thus, the magneto-optical recording medium must be strictly designed for the conformity of various properties, such as for controlling the magnetic wall energy which affects the overwriting performance, high signal quality (large magnetic Kerr rotation angle) and high recording sensitivity (low Curie temperature), etc. As described, since an acceptable range of the magnetic property of the magneto-optical recording medium is narrow, in practice, the recording magnetic domain by overwriting does not disappear easily. Although the remaining magnetic domain is small, it reduces the erased ratio. In overwriting, the previous recording magnetized state must be known, and thus a complete overwriting by a single light beam cannot be ensured.

SUMMARY OF THE INVENTION

An object of the present invention is to provide a magneto-optical recording method which permits both the structure of a magneto-optical recording medium and the structure of a magneto-optical recording device to be simplified and also permits an overwriting with a reduced remaining amount of previously recorded information.

In order to achieve the above object, a magneto-optical recording method of the present invention is characterized by comprising the steps of:

applying an external magnetic field perpendicularly onto a magnetic thin film with perpendicular magnetization of A magneto-optical recording medium and projecting a light beam onto the magneto-optical recording medium; and modulating an intensity of the light beam between a first light intensity and a second light intensity in response to information to be recorded while a light beam spot is being shifted. In the above method, the first light intensity is set such that by reducing the coercive force of the magnetic thin film with perpendicular magnetization, a magnetic domain is formed on the magnetic thin film with perpendicular magnetization. The first light intensity is set such that by reducing the coercive force of the magnetic thin film with perpendicular magnetization, a magnetic domain is formed on the magnetic thin film with perpendicular magnetization, and the magnetic domain is shifted as a spot of the light beam is shifted. The second light intensity is set such that by increasing the coercive force of the magnetic thin film with perpendicular magnetization, the magnetic domain is fixed to the position.

In the above method, the exchange coupled magnetic doublelayer film which greatly affects the structure of the magneto-optical recording medium is not required, and the magneto-optical recording medium of a singlelayer structure may be used. Moreover, an overwriting operation with a reduced amount of remaining information after overwriting can be achieved only by modulating the intensity of the light beam in response to information to be recorded while the external magnetic field of a constant intensity is being applied. Thus, both the structure of the magneto-optical recording medium and the structure of the device for recording information can be simplified.

For a fuller understanding of the nature and advantages of the invention, reference should be made to the ensuing detailed description taken in conjunction with the accompanying drawings.

BRIEF DESCRIPTION OF THE DRAWINGS

FIG. 1 through FIG. 3 show one embodiment of the present invention.

FIG. 1(a) and FIG. 1(c) are explanatory views which respectively show changes in the light intensity of the light beam as time passes; and FIG. 1(b) and FIG. 1(d) are explanatory views which respectively show the magnetic domains formed on the recording layer.

FIG. 2(a) is an explanatory view which shows the temperature profile of a portion irradiated with the light beam of the magneto-optical disk; and FIG. 2(b) is an explanatory view which shows the magnetization state in the recording layer.

FIG. 3 is a diagram which shows schematic configuration of a magneto-optical disk device and a magneto-optical disk.

DESCRIPTION OF THE EMBODIMENTS

Figure 2A:
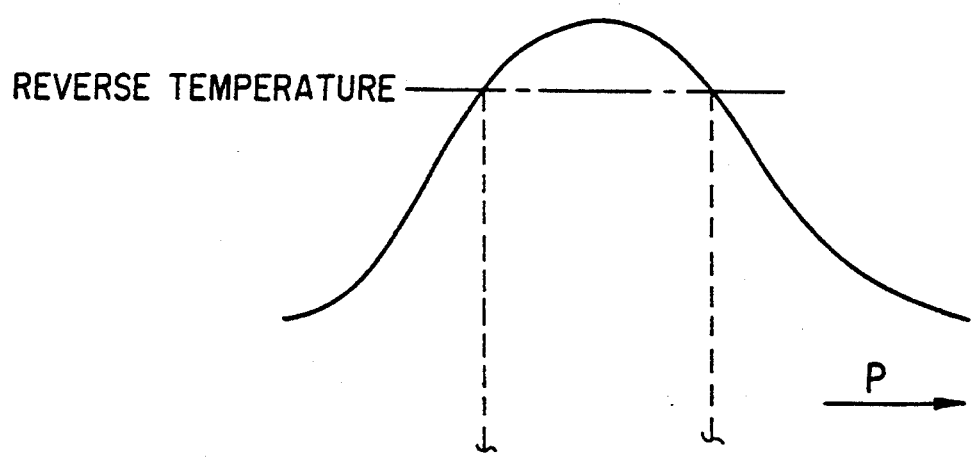
FIG. 2(a) and FIG. 2(b) are explanatory views which respectively explain the magneto-optical recording methods of the present invention.
Figure 2B:
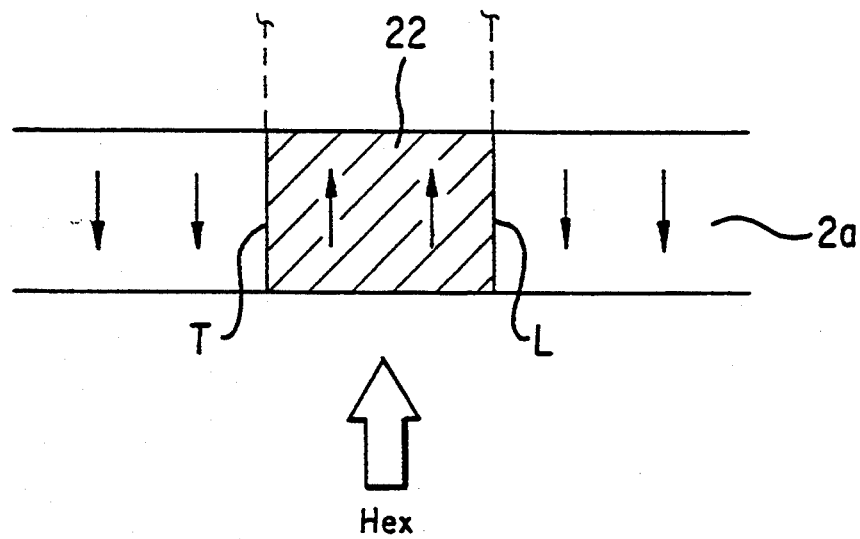
Figure 3:
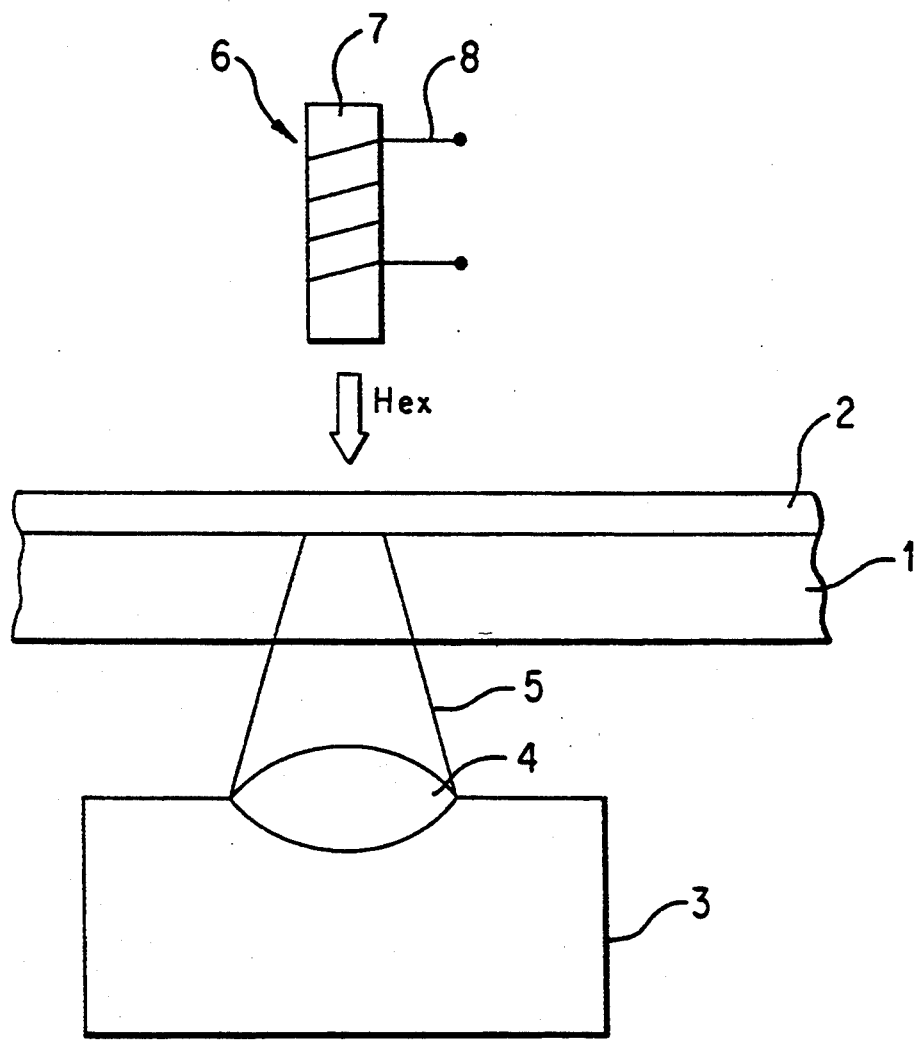

The following description will discuss one embodiment of the present invention in reference to FIG. 1 through FIG. 3.

As shown in FIG. 3, a magneto-optical disk (magneto-optical recording medium) of the present invention is composed of a disk-shaped substrate 1 whereon a magneto-optical recording medium layer 2 is formed. Further, a guide track for guiding a light beam 5 is normally formed on the magneto-optical recording medium layer 2 side of the substrate 1.

Figure 4:
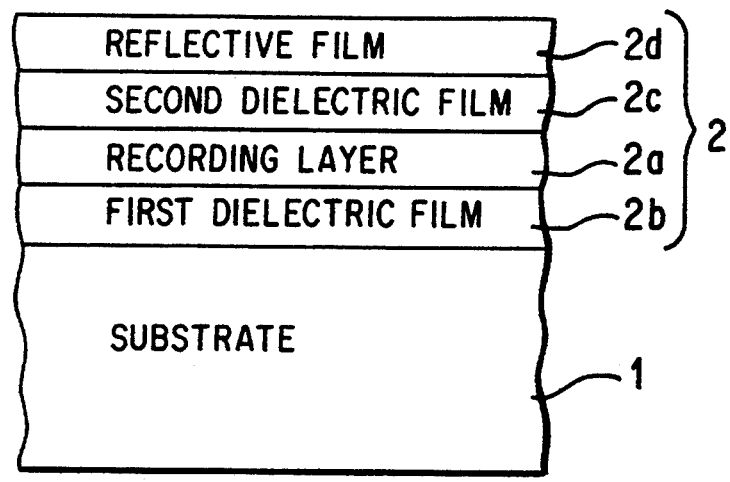
FIG. 4 shows one specific construction of a magneto-optical disk.

The magneto-optical recording medium layer 2 has a trilayer structure see FIG. 4, composed of a first dielectric film 2b, a recording layer 2a made of a magnetic thin film with perpendicular magnetization and a second dielectric film 2c which are laminated from the side of the substrate. The first and the second dielectric films are provided for protecting the recording layer. The first dielectric film also serves to enhance the magneto-optical Kerr effect. The magneto-optical recording medium layer 2 may have a quadrilayer structure wherein a reflecting film 2d is further provided on the second dielectric film.

Figure 5:
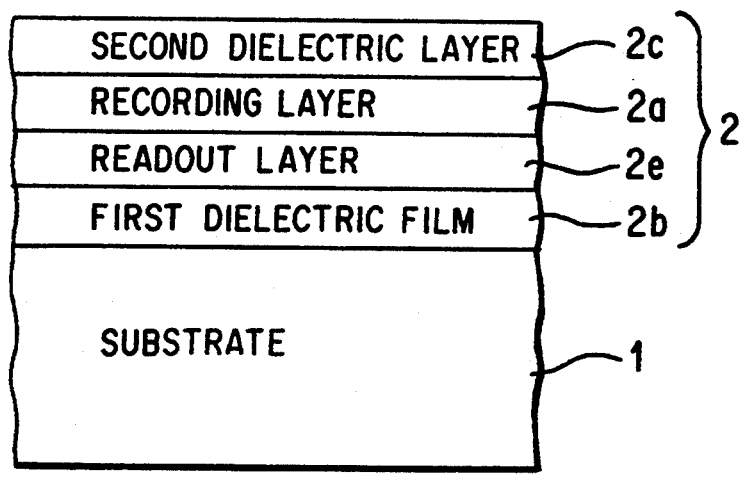
FIG. 5 shows another specific construction of a magneto-optical disk.

Alternatively, the magneto-optical recording medium layer 2 may have a quadrilayer structure, as shown in FIG. 5, composed of, for example, the first dielectric film 2b, the readout layer 2c (magnetic thin film with perpendicular magnetization) composed of a magnetic substance having a large magnetic Kerr rotation angle, the recording layer 2a (magnetic thin film with perpendicular magnetization) and the second dielectric film 2c which are laminated in this order from the side of the substrate 1.

The magneto-optical disk having a magneto-optical recording medium layer 2 of trilayer structure is, for example, composed of a glass substrate 1 whereon AlN (first dielectric film) with a thickness of 80 nm, $Gd_{0.28}Dy_{0.19}Fe_{0.53}$ (recording layer) with a thickness of 40 nm and AlN (second dielectric film) with a thickness of 50 nm are laminated in this order.

The magneto-optical disk having the magneto-optical recording medium layer 2 of a reflective quadrilayer film structure is, for example, composed of the glass substrate 1 whereon AlN (the first dielectric film) with a thickness of 80 nm, $Gd_{0.29}Dy_{0.18}Fe_{0.58}$ (recording layer) with a thickness of 30 nm, AlN (second dielectric film) with a thickness of 25 nm and Al (reflective film) with a thickness of 50 nm are laminated in this order.

The magneto-optical disk having the magneto-optical recording medium layer 2 of a quadrilayer structure including a readout layer is, for example, composed of the glass substrate 1 whereon AlN (first dielectric film) with a thickness of 80 nm, Dy0.46Fe0.45Co0.09 (readout layer) with a thickness of 30 nm, Gd0.28Dy0.19Fe0.53 (recording layer) with a thickness of 40 nm and AlN (second dielectric film) with a thickness of 50 nm are laminated in this order.

The magneto-optical disk device (magneto-optical recording and reproducing device) of the present embodiment is mainly composed of an optical head 3 placed on the substrate 1 side of the magneto-optical disk, an electromagnet 6 placed on the magneto-optical recording medium layer 2 side of the magneto-optical disk so as to confront the optical head 3.

The optical head 3 includes a light source such as a semiconductor laser and is provided with an objective lens 4 for converging the light beam emitted from the light source and for projecting a light beam 5 onto the magneto-optical recording medium layer 2.

The electromagnet 6 is composed of a magnetic core 7 and a coil 8 which is wound around the magnetic core 7, and it is arranged such that the external magnetic field Hex of a constant intensity is applied perpendicularly onto the magneto-optical recording medium layer 2 whereon a light beam 5 is being projected.

In the above recording method, information is recorded on the magneto-optical disk being rotated in a predetermined direction by modulating the intensity of the light beam 5 between the first light intensity and the second light intensity while an external magnetic field Hex of a constant intensity is being applied from the electromagnet 6 perpendicularly onto the magneto-optical recording medium layer 2.

Figure 1A:
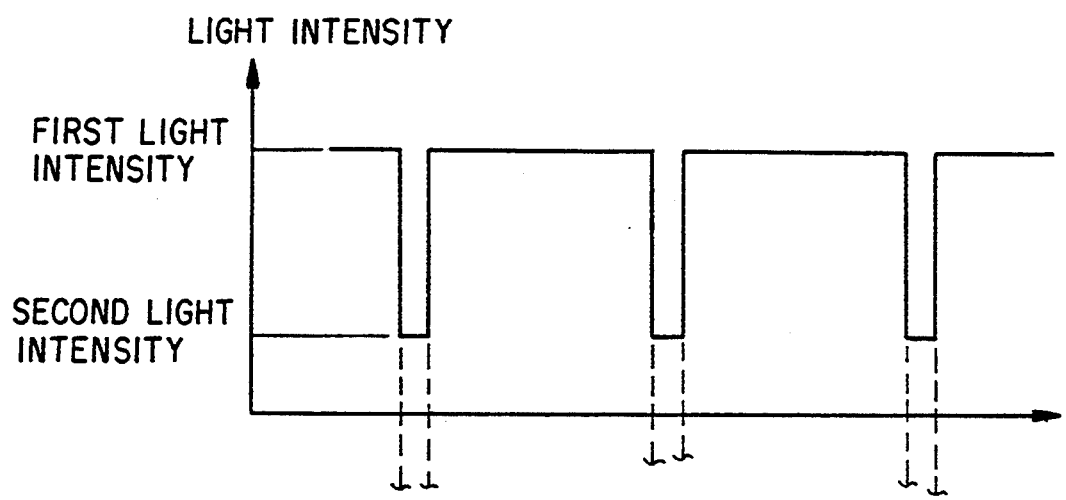
FIG. 1(a) through FIG. 1(d) are explanatory views of the magneto-optical recording method of the present invention.
Figure 1B:
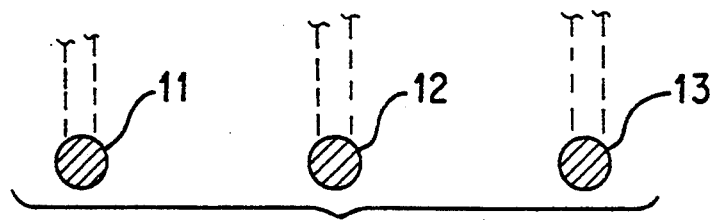

While the light intensity of the light beam 5 emitted from the light source of the optical head 3 is maintained at the first light intensity (High level), the light beam 5 is constantly projected onto the magneto-optical recording medium. As shown in FIG. 1(a), when the intensity of the light beam 5 in the recording layer of the magneto-optical recording medium layer 2 is pulsively lowered to a zero level or a predetermined level of the light intensity (Low level), a magnetic domain is formed only in the area where the intensity of the light beam 5 is the second light intensity (Low level) in the recording layer of the magneto-optical recording medium layer 2 as shown in FIG. 1(b).

Figure 1C:
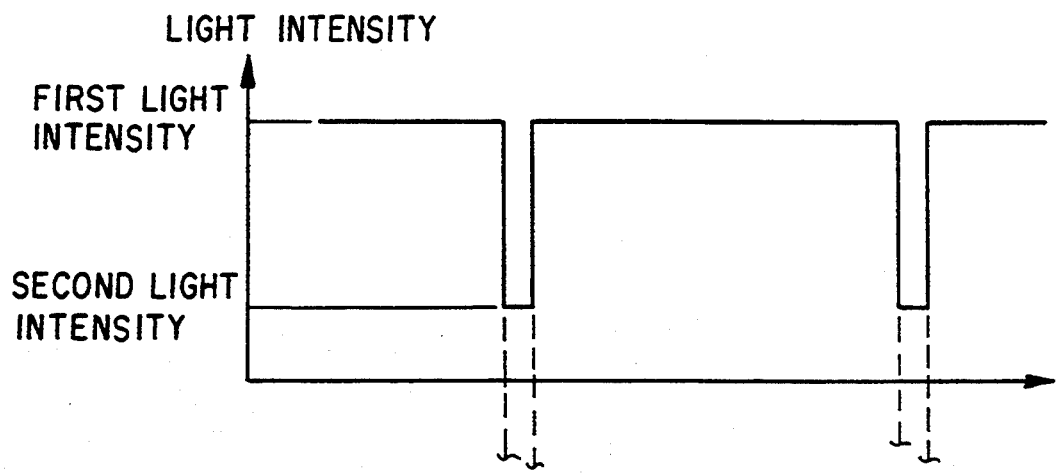

As shown in FIG. 1(c), when the light beam 5 of the first light intensity is projected on the bit string previously recorded on the magneto-optical disk, the bit string is erased, and only the area where the intensity of the light beam 5 is the second light intensity (Low level) in the recording layer of the magneto-optical recording medium layer 2, a magnetic domain is newly formed, thereby enabling a direct overwriting.

Here, an overwriting operation will be explained in reference to FIG. 2.

The following description will discuss the case where with an application of the external magnetic field Hex of a constant intensity, the magneto-optical disk is scanned by the light beam 5 of the first light intensity (High level). Since the light beam 5 is converged by the objective lens 4, the light intensity distribution shows a Gaussian distribution, and thus the temperature distribution on the magneto-optical disk also is like Gaussian distribution as shown in FIG. 2(a). In a recording layer 2a of the magneto-optical recording medium layer 2, as shown in FIG. 2(b), the magnetization is reversed in an area having a temperature rise above a predetermined threshold temperature (reverse temperature), and a portion 22 subjected to reversing of the magnetization (magnetic domain) surrounded by the magnetic wall is formed. Specifically, in the recording layer 2a of the magneto-optical recording medium layer 2, coercive force becomes smaller as the temperature thereof is raised by the projection of the light beam 5. In the area having a temperature rise above reverse temperature, the magnetization direction is arranged in the direction of the external magnetic field Hex, thereby reversing the magnetization in the area. Additionally, FIG. 2(b) shows the magnetic state of the recording layer 2a, and in the figure, the magnetization direction is indicated by an upward arrow or downward arrow.

In general, the force F exerted onto the unit area of the magnetic wall surrounding the cylindrical magnetic domain is represented by the following equation (1):

$$F = -\sigma_w/r - a\sigma_w/a_r + 2\,M_sH_d + 2\,M_sH_{ext} \quad (1)$$

In the above equation (1), $\sigma_w$ represents the energy density of the magnetic wall (magnetic wall energy per unit area), r represents the radius of cylindrical magnetic domain, Ms represents a saturation magnetization, Hd represents a demagnetizing field from the circumferential magnetization, and Hext represents the intensity of the external magnetic field Hex.

The movement of the magnetic wall is determined by the magnetic force F exerted onto the magnetic wall and the force 2 MsHc based on the coercive force Hc of the recording layer 2a, exerted so as to secure the magnetic wall. Namely, when the absolute value of the force F exerted onto the magnetic wall in the equation (1) is greater than 2 MsHc, the magnetic wall is moved. Especially, the first and the second terms on the right hand side of the equation (1) represent a force exerted onto the magnetic wall so as to shrink the magnetic domain. On the other hand, the third and the fourth terms on the right hand side of the equation (1) represent a force exerted on the magnetic wall so as to expand the magnetic domain.

When the spot of the light beam 5 on the magneto-optical disk is shifted in a direction of an arrow P, the portion L which is the head portion in the shifting direction of the spot of the light beam 5 of the magnetic wall surrounding the area 22 subjected to the reversing of magnetization (hereinafter referred to as the magnetic wall head portion) moves in a direction toward the smoother temperature gradient with the shift of the light beam spot. In the above equation (1) which represents the force F to be exerted on the magnetic wall, the absolute value of the second term on the right hand side which is most likely to be affected by the temperature gradient becomes smaller compared with other terms. Thus, the third and the fourth terms are dominant over other terms. As a result, a force is exerted on the magnetic wall head portion L so as to expand the magnetic domain.

On the other hand, the portion T which is the tail portion in the shifting direction of the spot of the light beam 5 of the magnetic wall surrounding the area 22 subjected to the reversing of magnetization (hereinafter referred to as the magnetic wall tail portion) moves in a direction toward the steeper temperature gradient with the shift of the light beam spot. In the above equation (1) which represents the force F to be exerted on the magnetic wall, the absolute value of the second term on the right hand side which is most likely to be affected by the temperature gradient becomes larger compared with other terms. Thus, a force is exerted on the magnetic wall tail portion T so as to shrink the magnetic domain.

Thus, the force exerted in the shifting direction of the spot of the light beam (beam scanning direction) is exerted onto the magnetic wall head portion L and the magnetic wall tail portion T of the magnetic wall surrounding the area 22 subjected to the reversing of the magnetization. As a result, the area 22 is moved in a shifting direction of the spot of the light beam 5.

The following description will explain the case where the light beam 5 of the first light intensity (High level) is scanned on the area where the magnetic domain (recording bit) is formed, which has the same magnetization direction as the area 22 subjected to the reversing of the magnetization. First, by projecting the light beam 5 onto the magnetic domain, the magnetic domain is absorbed in the area 22 subjected to the reversing of the magnetization, which is shifted as the spot of the light beam 5 is shifted. Thereafter, the magnetic domain is moved in the shifting direction of the spot of the light beam 5. As described, by projecting the light beam 5 of the first light intensity (High level), the magnetic domain in the recording layer is moved in the beam scanning direction. As a result, the magnetic domain is erased.

The following description will discuss the case where the light beam 5 is pulsively set at the second intensity (Low level). In this case, directly after the intensity of the light beam 5 is set at Low level, the temperature of the portion having a temperature rise by the projection of the light beam 5 is dropped by the thermal diffusion in the horizontal and vertical direction, and the temperature profile of the magneto-optical disk becomes substantially uniform. For this reason, the force is exerted onto the the magnetic wall head portion L and the magnetic wall tail portion T of the magnetic domain, whereon the force is exerted in the light spot shifting direction, so as to expand the magnetic domain by being affected by the smooth temperature gradient. Finally, the movement of the magnetic wall stops when the intensity of the force F exerted on the magnetic wall becomes equal to the force (2 MsHc) based on the coercive force Hc of the recording magnetic layer 2a, thereby forming an independent magnetic wall (recording bit) at the position.

In the described manner, the intensity of the light beam 5 which is successively projected in scanning the magneto-optical disk is pulsively changed from the first light intensity (High level) to the second light intensity (Low level) only while it is projected on the spot where the recording magnetic domain is to be formed (recording magnetic domain forming position). Thus, irrespectively of the pre-recording condition of the magneto-optical disk, only the spot corresponding to the second light intensity (Low level) of the recording layer, (i.e., the portion where recording magnetic domain is formed), the magnetic domain having a magnetization in the same direction as the external magnetic field Hex can be formed, thereby achieving a complete direct overwriting.

In the magneto-optical recording method of the present embodiment, an exchange-coupled magnetic film of doublelayer structure which requires a more precise adjustment of the layers is not required, and a magneto-optical disk of single magnetic layer structure may be used, thereby simplifying the structure of the magneto-optical disk. Moreover, overwriting is enabled only by modulating the intensity of the light beam 5 in response to the information to be recorded while an external magnetic field Hex of a constant intensity is being applied, thereby simplifying the structure of the magneto-optical disk device.

Using the magneto-optical disk and the magneto-optical disk device, an overwriting test was conducted. First, in the case where the magneto-optical disk including a magneto-optical recording medium layer 2 of trilayer structure will be explained.

On the glass substrate, AlN with a thickness of 80 nm, Gd0.27Dy0.18Fe0.55 with a thickness of 30 nm and AlN with a thickness of 50 nm were formed in this order by the sputtering method. Gd0.27Dy0.18Fe0.55 (recording layer) was set so as to have Curie temperature of 160° C. and compensation temperature of 80° C. For recording conditions, the intensity of the external magnetic field Hex was set at 100 Oe, the High level of the laser beam, the Low level of the laser beam, the pulse period and the pulse width corresponding to the Low level were respectively set 8 mW, 1 mW, 5 ms and 250 μs. Under the above conditions, the magneto-optical disk was rotated at a relative linear velocity of 1 mm/s with respect to the laser beam. As a result, on the GdDyFe (recording layer 2a), the cylindrical magnetic domains 11, 12 and 13 were formed as shown in FIG. 1(b).

Thereafter, the portion of the recording layer 2a, where the magnetic domains 11, 12 and 13 were formed was scanned by the laser beam under the above recording conditions while the intensity of the laser beam was maintained at High level. As a result, the cylindrical magnetic domains 11, 12 and 13 were erased.

Figure 1D:
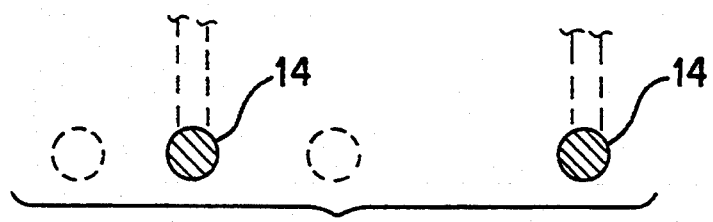

Next, information was recorded on the magneto-optical disk under the above recording conditions, and the magnetic domains 11, 12 and 13 were formed as shown in FIG. 1(b). Thereafter, as shown in FIG. 1(c), overwriting was carried out on the magnetic domains 11, 12 and 13 under the above recording conditions except that the pulse period was set 1.5 times of that in the above recording conditions (i.e., 7.5 ms). As a result, as shown in FIG. 1(d), the magnetic domains 11 and 12 formed at the portion whereon the laser beam of High level was scanned were erased; on the other hand, in the portion where the laser beam of Low level was projected, the magnetic domain 14 was formed both on the newly recorded portion and the portion overlapping the previously formed magnetic domain 13, thereby confirming that the overwriting was permitted.

The same experiment was conducted using the magneto-optical disk including a recording layer 2a made of Gd0.20Tb0.20Fe0.60 in lieu of Gd0.27Dy0.18Fe0.55, and the experimental results confirmed that the overwriting was permitted.

In pursuit of an improvement in the reproducing performance, the same experiment was conducted as described below, using the magneto-optical disk including the magneto-optical recording medium layer 2 of a quadrilayer structure, wherein a readout layer made of a magnetic material having a large magnetic Kerr rotation angle was formed on the recording layer.

On the glass substrate, AlN with a thickness of 80 nm, Dy0.46Fe0.45Co0.09 (readout layer) having a Curie temperature at 200° C., Gd0.28Dy0.19Fe0.53 with a thickness of 40 nm (recording layer) and AlN with a thickness of 50 nm were formed in this order by sputtering, thereby manufacturing the magneto-optical disk. For recording conditions, the intensity of the external magnetic field, the High level of the laser beam and the Low level of the laser beam were respectively set 200 Oe, 10 mW and 1 mW, and the same overwriting test was conducted. Form the above experimental results, the same overwriting operation as the previous test was achieved. When the above magneto-optical disk was used, the magnetic Kerr rotation was 1.5–2 times as large as that of the magneto-optical disk having the magneto-optical recording medium layer 2 of a trilayer structure, thereby achieving an improvement in the reproducing performance.

Another magneto-optical disk which has the magneto-optical recording medium layer 2 of the quadrilayer structure including the reflective film devised in pursuit of the improvement in the reproducing performance is shown below.

On the glass substrate, AlN with a thickness of 80 nm, Gd0.29Dy0.18Fe0.53 (recording layer) with a thickness of 40 nm, AlN with a thickness of 25 nm and Al (reflecting film) with a thickness of 50 nm were formed in this order by the sputtering method. For recording conditions, the intensity of the external magnetic field, the High level of the laser beam and the Low level of the laser beam were respectively set 100 Oe, 8 mW and 1 mW, and the same overwriting test was conducted. As a result, the above experimental results confirmed the same overwriting operation. When the above magneto-optical disk was used, the magnetic Kerr rotation angle was twice as large as that of the magneto-optical disk having the magneto-optical recording medium layer 2 of the trilayer structure, thereby achieving an improvement in the reproducing performance.

Figure 6:
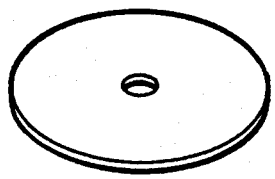
FIG. 6 shows a magneto-optical disk.
Figure 7:
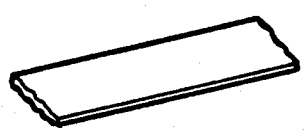
FIG. 7 shows a magneto-optical tape.
Figure 8:
FIG. 8 shows a magneto-optical card.

In the above embodiment, an explanation has been given through the case of the magneto-optical disk (see FIG. 6) as a magneto-optical recording medium. However, the present invention is not limited to this, and it is also applicable to the case of a magneto-optical tape (see FIG. 7), a magneto-optical card (see FIG. 8), etc.

As described, the magneto-optical recording method of the present invention is characterized by comprising the steps of:

applying an external magnetic field perpendicularly onto the magnetic thin film with perpendicular magnetization of the magneto-optical recording medium and projecting a light beam onto the magneto-optical recording medium; and modulating the intensity of the light beam between a first intensity and a second intensity in response to the information to be recorded while shifting the position of the light beam to be irradiated. In the above method, the first light intensity is set such that by reducing the coercive force of the magnetic thin film with perpendicular magnetization, a magnetic domain is formed on the magnetic thin film with perpendicular magnetization, and that the magnetic domain is moved as the spot of the light beam moves. The second light intensity is set such that by increasing the coercive force of the magnetic thin film with perpendicular magnetization, the magnetic domain is fixed to the position.

In the above magneto-optical recording method, a magneto-optical recording medium including a magnetic thin film with perpendicular magnetization is used, and while an external magnetic field of a constant intensity is being applied in a direction perpendicular to the magnetic thin film with perpendicular magnetization, a light beam which is to be modulated between the first light intensity and the second light intensity in response to the information to be recorded is projected while the beam projected portion is being shifted with respect to the magneto-optical recording medium, thereby recording information on the magneto-optical recording medium.

Namely, when the light beam of the first light intensity was projected on the magneto-optical recording medium, the coercive force of the magnetic thin film with perpendicular magnetization becomes smaller as the temperature thereof is raised, thereby forming a magnetic domain having the magnetization in the direction of the external magnetic field. Here, a magnetic force is exerted on the magnetic wall surrounding the magnetic domain so as to expand or to shrink the magnetic domain, and when the magnetic force becomes equal to the coercive force of the magnetic thin film with perpendicular magnetization, the movement of the magnetic wall is stopped. In the case of successively projecting the light beam of the first intensity onto the magneto-optical recording medium, since the coercive force of the magnetic thin film with perpendicular magnetization becomes small, a force is exerted on the magnetic wall in the shifting direction of the light spot, and thus the magnetic domain surrounded by the magnetic wall is moved in the direction the spot of the light beam moves.

In this case, if the magnetic domain (recording bit) is already formed on the magnetic thin film with perpendicular magnetization, by the projection of the light beam of the first intensity on the magnetic domain (recording bit), the magnetic domain (recording bit) is absorbed by the magnetic domain which moves as the spot of the light beam is shifted. Thereafter, the magnetic domain is moved in the shifting direction the spot of the light beam. As the magnetic domain is moved, the magnetic domain (recording bit) is consequently erased.

When the intensity of the light beam successively projected onto the magneto-optical recording medium is pulsively changed to the second light intensity, the temperature of the portion having a temperature rise as being projected by the light beam immediately drops by the thermal diffusion, and thus the coercive force of the magnetic thin film with perpendicular magnetization increases. Thus, the movement of the magnetic wall is stopped when the magnetic force exerted so as to move the magnetic wall and the coercive force of the magnetic thin film with perpendicular magnetization balance with one another, thereby forming an independent magnetic domain (recording bit) at the position.

As described, in the magneto-optical recording method of the present embodiment, an exchange coupled magnetic film of a doublelayer structure which requires more precise adjustment is not required, and a magneto-optical recording medium of a singlelayer structure may be used. Moreover, while applying an external magnetic field with a constant intensity, an overwriting with little remaining of the previously recorded information is enabled only by modulating the intensity of the light beam in response to information to be recorded, thereby simplifying the structures of both the magneto-optical recording medium and the device for recording information on the magneto-optical recording medium.

While this invention has been disclosed in conjunction with specific embodiments thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

What is claimed is:

1. A magneto-optical recording method comprising the steps of:

applying an external magnetic field perpendicularly onto a magnetic thin film with perpendicular magnetization of a magneto-optical recording medium and projecting a light beam onto said magneto-optical recording medium; and modulating an intensity of the light beam between a first light intensity and a second light intensity in response to information to be recorded while a spot of the light beam is being shifted, wherein the first light intensity is set such that by reducing a coercive force of the magnetic thin film with perpendicular magnetization, a magnetic domain is formed on the magnetic thin film with perpendicular magnetization and that the magnetic domain moves as the spot of the light beam is shifted, and the second light intensity is set such that by increasing the coercive force of the magnetic thin film with perpendicular magnetization, the magnetic domain is fixed.

2. The magneto-optical recording method as set forth in claim 1, wherein said magneto-optical recording medium comprises a substrate a property that light can be transmitted therethrough, whereon a first dielectric film, a recording layer composed of a magnetic thin film with perpendicular magnetization and a second dielectric film are formed in this order.

3. The magneto-optical recording method as set forth in claim 1, wherein said magneto-optical recording medium comprises a glass substrate whereon a first dielectric film made of AlN, a recording layer made of Gd0.27Dy0.18Fe0.55 and a second dielectric film made of AlN are formed in this order.

4. The magneto-optical recording method as set forth in claim 1, wherein said magneto-optical recording medium comprises a glass substrate whereon a first dielectric film made of AlN, a recording layer made of Gd0.20Tb0.20Fe0.60 and a second dielectric film made of AlN are formed in this order.

5. The magneto-optical recording method as set forth in claim 1, wherein said magneto-optical recording medium comprises a glass substrate whereon a first dielectric film made of AlN, a recording layer made of Gd0.28Dy0.19Fe0.53 and a second dielectric film made of AlN are formed in this order.

6. The magneto-optical recording method as set forth in claim 1, wherein said magneto-optical recording medium comprises a substrate having a property that light can be transmitted therethrough, whereon a first dielectric film, a recording layer composed of a magnetic thin film with perpendicular magnetization, a second dielectric film and a reflective film are formed in this order.

7. The magneto-optical recording method as set forth in claim 1, wherein said magneto-optical recording medium comprises a glass substrate whereon a first dielectric film made of AlN, a recording layer made of Gd0.29Dy0.18Fe0.53, a second dielectric film made of AlN and a reflective film made of AlN are formed in this order.

8. The magneto-optical recording method as set forth in claim 1, wherein said magneto-optical recording medium comprises a substrate having a property that light can be transmitted therethrough, whereon a first dielectric film, a readout layer composed of a magnetic thin film with perpendicular magnetization made of a magnetic substance having a large magnetic Kerr rotation angle, a recording layer composed of a magnetic thin film with perpendicular magnetization and a second dielectric film are formed in this order.

9. The magneto-optical recording method as set forth in claim 1, wherein said magneto-optical recording medium comprises a glass substrate whereon a first dielectric film made of AlN, a readout layer made of Dy0.46Fe0.45Co0.09, a recording layer made of Gd0.28Dy0.19Fe0.53 and a second dielectric film made of AlN are formed in this order.

10. The magneto-optical recording method as set forth in claim 1, wherein said magneto-optical recording medium is a magneto-optical disk.

11. The magneto-optical recording method as set forth in claim 1, wherein said magneto-optical recording medium is a magneto-optical tape.

12. The magneto-optical recording method as set forth in claim 1, wherein said magneto-optical recording medium is a magneto-optical card.

* * * * *